Feb. 4, 1969
F. J. WINCHELL ET AL
3,425,215
POWER TRAIN WITH ENGINE AND TORQUE CONVERTER
Filed Sept. 14, 1966
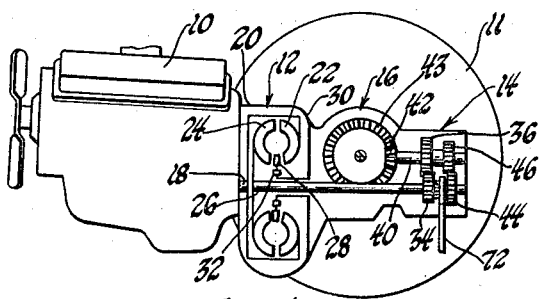
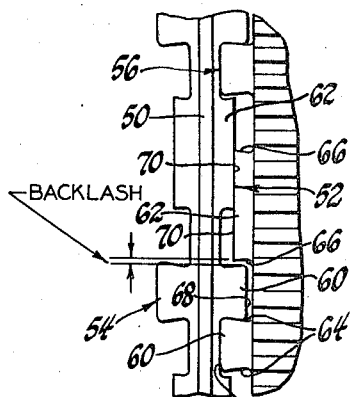
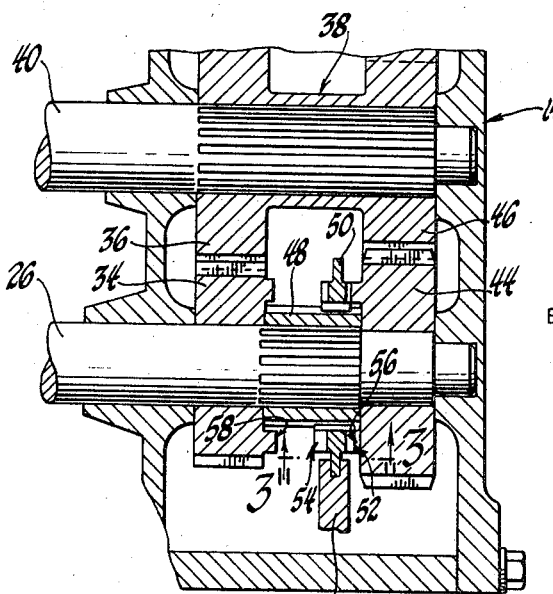
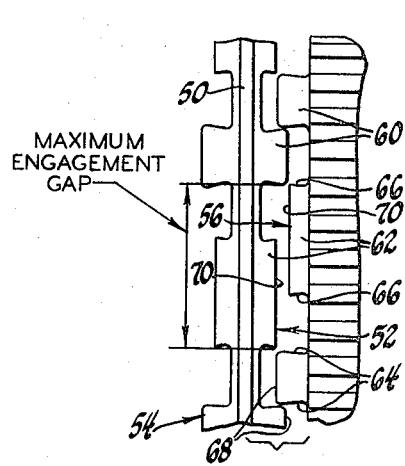
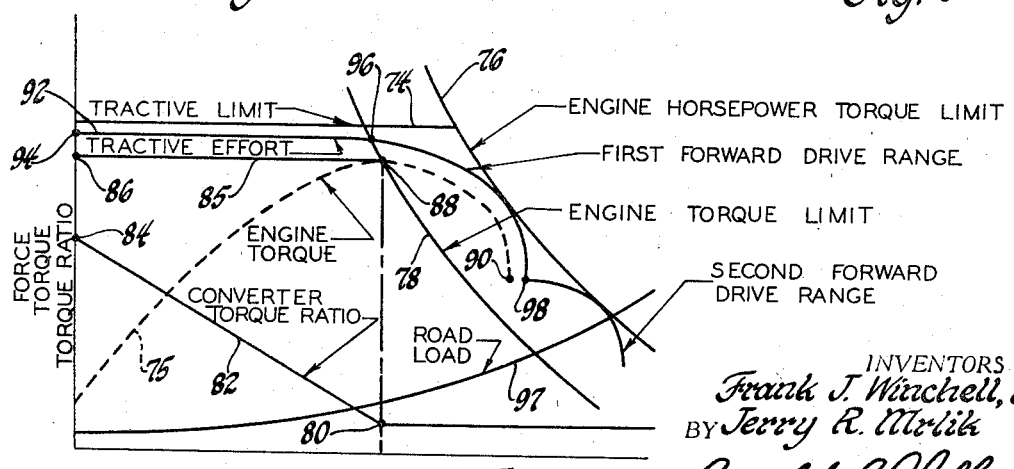
INVENTORS
Frank J. Winchell, &
BY Jerry R. Mrlik
Ronald L. Phillips
ATTORNEY

United States Patent Office 3,425,215
Patented Feb. 4, 1969

3,425,215
POWER TRAIN WITH ENGINE AND
TORQUE CONVERTER
Frank J. Winchell, Bloomfield Hills, and Jerry R. Mrlik, Birmingham, Mich., assignors to General Motors Corporation, Detroit, Mich., a corporation of Delaware
Filed Sept. 14, 1966, Ser. No. 579,351
U.S. Cl. 60—12     8 Claims
Int. Cl. F16d 39/00, 43/02

ABSTRACT OF THE DISCLOSURE

A power train which in the preferred embodiment has an engine and a torque converter whose coupling point occurs at the engine speed at which peak engine torque occurs and whose torque ratio provides substantially constant converter output torque approximating peak engine torque between converter stall and the coupling point.

---

This invention relates to power trains and more particularly to a vehicular engine-drive train combination for delivering and maintaining a tractive effort close to the tractive limit up to peak engine horsepower.

The power train according to this invention is illustrated for use in a vehicle and comprises an engine having a torque curve whose peak occurs at an engine speed close to the speed at which peak horsepower occurs and a drive train which includes a hydrodynamic torque converter and a differential and may also include a gear box for extending the vehicle speed range. The torque converter has a coupling point which occurs at peak engine torque and a torque ratio curve determine so that at any converter speed ratio from stall to coupling, the engine torque multiplied by the converter torque ratio substantially equals peak engine torque. With the converter output torque thus remaining substantially constant from stall to coupling and approximately equal to peak engine torque, the torque ratio of the mechanical drive train between the converter and the driving wheels is determined to provide a tractive effort to the driving wheels closely below the tractive limit of the driving wheels from converter stall to the coupling point. With the coupling point occurring at peak engine torque, the tractive effort delivered by the power train falls off with increasing vehicle speed in the converter coupling range until peak engine horse power is reached after which a shift to a higher speed range may be made should a higher terminal vehicle speed be desired. Since decrease in tractive effort only occurs between peak engine torque and peak engine horsepower, actual tractive effort approaches maximum possible useful tractive effort as the speed at which peak engine torque occurs approaches the speed at which peak engine horsepower occurs with the optimum occurring when these speeds coincide.

An object of this invention is to provide a matched engine and drive train for transmitting power to a load and maintaining the power train output force substantially constant as engine torque increases with increasing engine speed.

Another object of this invention is to provide an engine and drive train combination with the drive train including a hydrodynamic torque converter maintaining substantially constant converter output torque approximately equal to peak engine torque as engine torque increases with increasing engine speed with the converter coupling point occurring at peak engine torque.

Another object of this invention is to provide a vehicular power train including the combination of an engine whose torque characteristic increases, peaks and then decreases with increasing engine speed and a drive train including a hydrodynamic torque converter for maintaining the converter output torque close to peak engine torque and the power train output force delivered to the driving wheels below their tractive limit as engine torque increases with increasing engine speed with the converter coupling point occurring at peak engine torque and close to peak engine horsepower.

These and other objects of the invention will be more apparent from the following description of the preferred embodiment of the invention illustrated in the accompanying drawing.

FIGURE 1 diagrammatically shows a vehiclular power train embodying the features of this invention.

FIGURE 2 is a lonigtudinal view with parts in section of the gear box with one of the clutches engaged.

FIGURE 3 is an enlarged view taken on the line 3—3 in FIGURE 2.

FIGURE 4 is a view similar to FIGURE 3 and shows the clutch during an engagement.

FIGURE 5 shows the power train operating characteristics.

The vehicular power train, as illustrated in FIGURE 1, generally comprises an internal combustion engine 10 connected to the vehicle's rear driving wheels 11 by a drive train including a hydrodynamic torque converter 12, a two-speed gear box 14 and a differential 16. The differential 16 is located intermediate the converter 12 and the gear box 14 and with the units thus arranged, there is provided a compact power train package particularly suitable for rear engine drive vehicles. The gear box 14 is conditionable from neutral to either a low speed ratio to establish a first forward drive range or a high speed ratio to establish a second forward drive range. The gear box 14 may also be provided with suitable reverse gearing which is not necessary for the demonstration of this invention.

Describing the components in detail, the engine crankshaft 18 is connected at its rear end to the rotary torque converter housing 20 of the three-element converter 12; housing 20 being connected to drive the converter pump 22. The converter turbine 24 is connected to the converter output shaft 26 and the stator 28 is fixed to the stationary transmission housing 30 via a suitable one-way brake 32 which holds the stator 28 against backward rotation.

As in conventional three-element torque converters, the pump centrifugally pumps fluid into the turbine which in turn absorbs the energy of the fluid by deflecting and discharging the fluid in the backward direction. The stator provides the necessary torque reaction by redirecting the backward flow from the turbine to the forward direction to discharge it into the pump to complete the cycle. Since the three converter elements work in a closed toroidal circuit, this cycle is repeated continuously. As the speed of the turbine increases, it builds up a centrifugal head which is counter to the head of the pump thereby gradually reducing the flow and consequently reducing the backward force on the stator. As this process continued with the turbine further increasing in speed, the flow is eventually reduced to a value where the force on the stator becomes zero which is the point at which the converter ceases to multiply torque and starts to function as a fluid coupling, this point being defined as the coupling point. In the coupling range, the stator rotates in the forward direction with a gradually increasing speed as the turbine increases its speed.

The converter output shaft 26 provides the input to the gear box 14 which, as best shown in FIGURE 2, has a low speed ratio gear train provided by a spur gear 34 journaled on shaft 26 and in constant mesh with the spur gear 36 of a cluster gear member 38. Gear member 38 is splined to the gear box output shaft 40. As shown in FIGURE 1, shaft 40 is connected to the drive pinion 42 of the differential 16; the pinion meshing with the differential ring gear 43. Upon prevention of rotation between gear 34 and shaft 26, the gear box output shaft is driven in a direction opposite the gear box input shaft and at a speed determined by gears 34 and 36 to provide the low speed ratio drive.

The gear box high speed ratio gear train is provided by a spur gear 44 having a larger diameter than gear 34 journaled on shaft 26 and in constant mesh with the smaller spur gear 46 of cluster gear member 38. Upon prevention of relative rotation between gear 44 and shaft 26, the gear box output shaft is driven in a direction opposite the gear box input shaft and at a speed higher than that in the low speed ratio drive as determined by meshing gears 44 and 46 to provide a high speed ratio drive.

The clutch assembly for selectively clutching the input gears 34 and 44 to the shaft 26 and also for disconnecting both gears from the gear box input drive comprises a sleeve 48 internally splined to shaft 26. External, axially extending splines on sleeve member 48 are slideably engaged by the internal splines of a shifter sleeve 50; the sleeve 50 also serving to space the gears 34 and 44 in their fixed axial positions on shaft 26. The shifter sleeve 50 has back-to-back dog clutch faces 52 and 54 for selectively engaging dog clutch faces 56 and 58 provided on gears 44 and 34, respectively. As best shown in FIGURES 3 and 4, each dog clutch face has alternating dogs of different axial lengths, the numeral 60 designating the long dogs and the numeral 62 designating the short dogs. Each of the dogs has a dove tail configuration with the radial side faces 64 and 66 of the dogs 60 and 62, respectively, inclined or tapered inward at the same angle from the dog end faces toward a longitudinal plane bisecting each dog and passing through the clutch axis. The end faces 68 of the long dogs are flat and lie on a common plane perpendicular to the clutch axis. Similarly, the end faces 70 of the short dogs are flat and lie on a common plane perpendicular to the clutch axis. The short dog end faces are wider than the long dog end faces for reasons which will become more apparent from the description of clutch operation described later.

The control linkage for effecting selective movement of the shifter sleeve 50 may be conventional linkage and include a shifter fork 72, only a part of which is shown. The fork has an internal channel received by an annular flange provided on the shifter sleeve for moving the shifter sleeve axially for the drive engagements and neutral.

Describing the dog clutch engagement, which is similar for both high and low speed drive engagement, the long and short dog end faces of shifter sleeve 50 and either gear 44 of gear 34 are positioned for initial engagement under operator control and with an engagement gap whose maximum, as shown in FIGURE 4 for high drive, is the circumferential width of the space between adjacent long dogs on the shifter clutch face 52 minus the circumferential width of the long dogs on the gear clutch face 56. The term circumferential width could also be expressed as length in radians. As the engaging clutch faces rotate relative to each other, the opposed dog end faces contact and guide the driving sides of the long dogs of the shifter sleeve on a path perpendicular to the axis of rotation and into engagement with the driven sides of the long dogs of the gear whereafter the camming action resulting from their side inclination forces the cooperating long dogs into full engagement moving the shifter sleeve axially to its full engaged position as shown in FIGURE 3. The drive engagement which results after the shift is either long-against-long dog or long-against-short dog depending on the direction of relative clutch face rotation during the shift.

Thus, the dog clutch engagement is caused to occur with short controlled shift travel in a short shift time since the initial nonsynchronous long and short dog and faces contact is all that the operator is called on to perform, the full dog clutch engagement being effected by the clutch faces. Since the long dogs on the opposed clutch faces have a large engagement gap, the space between adjacent long and short dogs on one clutch face for receiving the long dogs on the opposite clutch face need only be sufficiently wide for long dog accommodation resulting in a small backlash as identified in FIGURE 3 and minimizing drive line looseness. Thus, rapid and efficient shifts under manual control can be made to connect the converter 12 to the vehicle's driving wheels and with nonsynchronized dog clutch engagement without ratcheting.

In order to make maximum use of the available engine power, the tractive effort delivered to the driving wheels should be close to, but not exceed, the tractive limit of the driving wheels to prevent wheel slippage or skid; the tractive effort being expressible as the net force in pounds delivered to drive the wheels and the tractive limit also being expressible as force in pounds and a function of the vertical loads on the driving wheels multiplied by the coefficient of friction between the wheels and supporting road surface. The tractive limit and tractive effort could also be expressed as torque. A typical tractive limit in terms of force plotted against vehicle speed is generally indicated by the curve 74 in FIGURE 5 and remains substantially constant over the vehicle's speed range assuming the vertical wheel load and coefficient of friction remain constant. According to this invention, the engine 10 is preferably selected to have a torque curve whose peak occurs at an engine speed close to the speed at which peak engine horsepower occurs. Curve 75 generally indicates engine torque plotted against engine speed. The maximum possible available force plotted against vehicle speed for accelerating the vehicle is generally indicated by curve 76 assuming an infinitely variable transmission which would allow the engine to continuously operate at its peak horsepower which occurs at a particular engine speed. Curve 78 generally indicates the maximum available force at the engine torque peak which occurs at a lower engine speed; the force being plotted against vehicle speed. The torque converter 12 is determined by converter design parameters including size and blade angle to have its coupling point, as indicated at 80, occur at peak engine torque, i.e., the engine speed at which peak engine torque occurs, and a converter torque ratio plotted against engine speed, as indicated by curve 82, such that at any converter speed ratio from stall, as indicated at 84, to the coupling point 80, the available engine torque multiplied by the converter torque ratio will approximately equal peak engine torque as indicated by curve 85 between points 86 and 88. Thus, the converter output torque is caused to remain substantially constant from stall to the coupling point and approximately equal to peak engine torque and thereafter fall on the engine torque curve between points 88 and 90 since the converter is then in the coupling range and does not provide torque multiplication.

With the combined engine and converter operation described above, the tractive effort from stall to the coupling point is made constant and a function of the total mechanical drive ratio between the converter and the road surface. By changing the total mechanical ratio, it is possible to provide a family of tractive effort curves parallel to the converter output torque curve defined by points 86, 88 and 90. The total mechanical drive ratio in the first forward drive range is determined so that the complete power train provides a tractive force effort plotted against vehicle speed as generally indicated by the curve 92 to bring the tractive effort close to but not exceed the tractive limit in the converter torque multiplication range between points 94 and 96. The tractive effort is shown as the net value which is the force available to accelerate the vehicle after the road load force requirement, as generally indicated by curve 97, has been satisfied. It will be observed that the road load remains relatively low throughout the converter torque multiplication range and therefore affects the maintenance of constant tractive effort to only a small degree.

Thus, with the power train conditioned in the first forward drive range the net tractive effort 92 delivered to the driving wheels is immediately below the tractive limit and remains substantially constant from zero vehicle speed up to its intersection 96 with the peak torque curve 78 at which point the converter reaches its coupling point and the tractive effort falls off according to the engine torque characteristic and becomes tangent with the horsepower limit force curve 76. The tractive effort continues to drop off with increasing vehicle speed and an upshift should be made for higher vehicle speeds. For example, at the vehicle speed corresponding to point 98 on the tractive effort curve 92, the gear box may be upshifted to its high speed ratio to establish the second forward drive range thereby extending the tractive effort curve which again falls off to become tangent with the horsepower limit force curve. With continuing increase in vehicle speed, the tractive effort continues to fall off until terminal vehicle speed is eventually reached.

Thus, the power train delivers a tractive effort to the driving wheels as close as possible to but not exceeding the wheels' tractive limit up to peak engine torque so that maximum use of engine power is obtained throughout the engine speed range in which engine torque increases with increasing engine speed. Since the decrease in tractive effort occurs in the relatively small engine speed range between peak engine torque and peak engine horsepower, th powr train makes highly efficient use of the maximum possible available force with the actual tractive effort approaching maximum useful tractive effort as the speed at which peak engine torque occurs approaches the speed at which peak engine horsepower occurs. Maximum possible use of engine power for driving the vehicle wheels within the horsepower limit will occur when the speed at which peak engine torque occurs coincides with the speed at which peak engine horsepower occurs. It will also be understood that the tractive limit and thus the maximum useful tractive effort will vary with different vehicles and also road conditions such as dry roads as compared with wet roads. The tractive effort curve can be shifted in a direction parallel to the converter output torque curve so that the tractive effort is held close to the tractive limit which shift can be accomplished by simply changing the gear ratios in the gear box and/or differential and/or the rolling wheel radius. Furthermore, the gear box may be provided with additional gear ratios to extend the vehicle's terminal speed and may also have only one forward drive ratio where a lower terminal vehicle speed is desired.

The invention may be modified within the scope of the appended claims.

We claim:

1. In a power train the combination of an engine whose torque characteristic increases, peaks and then decreases with increasing engine speed and drive means including infinitely variable ratio means having a torque ratio decreasing with increasing engine speed similar to the rate the engine torque increases with increasing speed operative only while the engine torque increases with increasing speed for transmitting engine power to a load and maintaining and delivering a substantially constant tractive effort to the load approximating the tractive limit of the load throughout the speed range in which engine torque increases with increasing engine speed.

2. The power train set forth in claim 1 and said infinitely variable ratio drive means comprising hydrodynamic torque converter means operable to maintain converter output torque at approximately peak engine torque throughout the speed range in which engine torque increases with increasing engine speed.

3. The power train set forth in claim 1 and said infinitely variable ratio drive means comprising hydrodynamic torque converter means having a coupling point occurring at peak engine torque.

4. The power train set forth in claim 1 and said engine having peak torque occurring at an engine speed approximating the speed at which peak engine horsepower occurs.

5. The power train set forth in claim 1 and said infinitely variable drive ratio means comprising hydrodynamic torque converter means having a stall torque ratio approximating the ratio of peak engine torque to engine torque at converter stall speed and a coupling point occurring at peak engine torque.

6. In a power train the combination of an engine whose torque characteristic increases, peaks and then decreases with increasing engine speed and whose peak torque occurs at an engine speed approximating the engine speed at which peak horsepower occurs, and hydrodynamic torque converter means having a torque ratio decreasing with increasing speed similar to the rate the engine torque increases with increasing speed operative only while engine torque increases with increasing speed and also having a coupling point occurring at peak engine torque for maintaining converter output torque at approximately peak engine torque throughout the speed range in which engine torque increases with increasing engine speed.

7. The power train set forth in claim 6 and said drive means operatively connecting said engine to a vehicle's driving wheels and having a mechanical ratio determined by the converter output torque that is maintained and the driving wheels' tractive limit for maintaining and delivering a tractive effort to the driving wheels approximating the tractive limit of the driving wheels throughout the speed range in which engine torque increases with increasing engine speed.

8. In a power train the combination of an engine whose torque characteristic increases, peaks and then decreases with increasing engine speed and hydrodynamic torque converter means driven by said engine for providing an infinitely variable torque ratio decreasing with increasing engine speed in the range of engine speeds providing increasing engine torque with the products of said torque ratio and said engine torque at each engine speed in said range of engine speeds approximately equal and approximately equal to said peak engine torque.

References Cited

UNITED STATES PATENTS

| | | | |
|---|---|---|---|
| 3,010,278 | 11/1961 | Winchell et al. | 60—12 |
| 3,077,730 | 2/1963 | Glamann | 60—12 |
| 3,151,444 | 10/1964 | Jonkers et al. | 60—12 |
| 3,161,015 | 12/1964 | Knowles et al. | 60—12 |

MARTIN P. SCHWADRON, *Primary Examiner.*

U.S. Cl. X.R.

192—92